US008856639B1

(12) United States Patent
Strudell et al.

(10) Patent No.: US 8,856,639 B1
(45) Date of Patent: Oct. 7, 2014

(54) SYSTEMS AND METHODS FOR ONLINE DOCUMENT SIGN-UP

(75) Inventors: Evgenia Voskresenskaya Strudell, San Antonio, TX (US); Viktor Darrell Danelius, San Antonio, TX (US); Dale Alan Wagner-Krankel, San Antonio, TX (US); Bryan Hall, San Antonio, TX (US); Kevin Kenneth Fiedler, Helotes, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 1303 days.

(21) Appl. No.: 11/782,568

(22) Filed: Jul. 24, 2007

(51) Int. Cl.
*G06F 17/21* (2006.01)

(52) U.S. Cl.
USPC ............................ 715/221; 715/224; 715/234

(58) Field of Classification Search
CPC ... G06F 17/00; G06F 17/24; G06F 17/30011; G06F 17/30165; G06F 17/30867; G06F 19/328; G06F 21/10; G06F 21/60; G06F 3/0484; G06Q 10/06; G06Q 10/10; G06Q 10/107; G06Q 20/102; G06Q 20/14; G06Q 20/22; G06Q 20/28; G06Q 20/40; G06Q 20/4016; G06Q 30/02; G06Q 30/0201; G06Q 30/0222; G06Q 30/0255; G06Q 30/0609; G06Q 30/0641; G06Q 40/02; G06Q 40/06; G06Q 40/08; G06Q 50/01; G06Q 50/06; H04N 21/4722; H04N 21/4725; H04N 21/4728; H04W 12/00; H04W 48/08
USPC ......................................... 715/221, 224, 234
See application file for complete search history.

(56) References Cited

U.S. PATENT DOCUMENTS

| 5,699,528 | A | * | 12/1997 | Hogan ............................ 705/40 |
| 5,706,507 | A | * | 1/1998 | Schloss ......................... 709/225 |
| 5,903,881 | A | * | 5/1999 | Schrader et al. ................ 705/42 |
| 5,963,925 | A | * | 10/1999 | Kolling et al. .................. 705/40 |
| 6,072,493 | A | * | 6/2000 | Driskell et al. ............... 715/854 |
| 6,078,907 | A | * | 6/2000 | Lamm ............................ 705/40 |
| 6,268,924 | B1 | | 7/2001 | Koppolu et al. |
| 6,343,327 | B2 | | 1/2002 | Daniel et al. |
| 6,429,946 | B1 | | 8/2002 | Bresnan et al. |
| 6,463,466 | B1 | | 10/2002 | Weyer |

(Continued)

OTHER PUBLICATIONS

Gina Carrillo; Show Me Quicken® 2006; Oct. 21, 2005; Que Publishing; p. 106.*

(Continued)

*Primary Examiner* — Andrew Dyer
(74) *Attorney, Agent, or Firm* — Eric Sophir; Dentons US LLP

(57) ABSTRACT

Systems and methods for managing documents are described. A system comprises one or more modules to present controls that reflect a hierarchy of documents available for online delivery, receive an indication of selected controls, and manage online document delivery (ODD) using the indication. A system for presenting a single-page ODD sign-up, comprises one or more modules to identify a user of an online system, determine a financial account associated with the user, and present a hierarchical control, including the financial account, in the single page to the user. A system comprises one or more modules to receive, from a support representative, a user's preference associated with ODD; receive, from an online interface, an indication that the user accepts an agreement associated with ODD; and manage ODD using the indicia reflecting the user's preference after the indication that the user agreed to the agreement has been received. Other embodiments are described.

15 Claims, 7 Drawing Sheets

(56) References Cited

U.S. PATENT DOCUMENTS

| | | |
|---|---|---|
| 6,584,466 B1 | 6/2003 | Serbinis et al. |
| 6,615,234 B1 | 9/2003 | Adamske et al. |
| 6,701,315 B1 * | 3/2004 | Austin .................................. 1/1 |
| 6,721,716 B1 * | 4/2004 | Gross ............................... 705/40 |
| 6,782,415 B1 | 8/2004 | Quine |
| 6,782,506 B1 | 8/2004 | Burakoff et al. |
| 6,877,136 B2 | 4/2005 | Bess et al. |
| 7,184,970 B1 | 2/2007 | Squillante |
| 7,240,028 B1 * | 7/2007 | Rugge .............................. 705/30 |
| 7,395,241 B1 * | 7/2008 | Cook et al. ....................... 705/39 |
| 7,395,243 B1 * | 7/2008 | Zielke et al. ..................... 705/40 |
| 7,424,543 B2 | 9/2008 | Rice, III |
| 7,480,860 B2 * | 1/2009 | White .......................... 715/255 |
| 7,686,219 B1 * | 3/2010 | Wisilosky et al. ............. 235/385 |
| 7,708,194 B2 * | 5/2010 | Vawter ........................... 235/380 |
| 7,729,963 B1 * | 6/2010 | Lego et al. ....................... 705/35 |
| 7,774,271 B1 * | 8/2010 | Edwards et al. ................ 705/38 |
| 8,326,747 B2 * | 12/2012 | Ang et al. ....................... 705/38 |
| 2001/0032182 A1 * | 10/2001 | Kumar et al. ................... 705/40 |
| 2001/0056387 A1 | 12/2001 | Magary et al. |
| 2002/0013768 A1 * | 1/2002 | Ganesan ......................... 705/40 |
| 2002/0023055 A1 * | 2/2002 | Antognini et al. .............. 705/40 |
| 2002/0128954 A1 * | 9/2002 | Evans ............................. 705/37 |
| 2002/0129108 A1 * | 9/2002 | Sykes, Jr. ....................... 709/206 |
| 2002/0138445 A1 * | 9/2002 | Laage et al. .................... 705/67 |
| 2002/0188483 A1 | 12/2002 | Fisher |
| 2003/0055783 A1 * | 3/2003 | Cataline et al. ................ 705/40 |
| 2003/0093373 A1 | 5/2003 | Smirnoff et al. |
| 2003/0107757 A1 | 6/2003 | Gupton et al. |
| 2004/0078434 A1 | 4/2004 | Parker et al. |
| 2004/0107163 A1 | 6/2004 | Dutta et al. |
| 2004/0210520 A1 * | 10/2004 | Fitzgerald et al. .............. 705/40 |
| 2004/0236653 A1 * | 11/2004 | Sokolic et al. ................. 705/35 |
| 2004/0254881 A1 * | 12/2004 | Kumar et al. ................... 705/40 |
| 2005/0108064 A1 | 5/2005 | Castleman et al. |
| 2005/0108124 A1 | 5/2005 | Colleran et al. |
| 2005/0137948 A1 | 6/2005 | Kissner et al. |
| 2005/0144126 A1 | 6/2005 | Commodore et al. |
| 2005/0154769 A1 * | 7/2005 | Eckart et al. ................... 707/201 |
| 2005/0177505 A1 * | 8/2005 | Keeling et al. .................. 705/40 |
| 2006/0167771 A1 | 7/2006 | Meldahl |
| 2007/0043846 A1 | 2/2007 | Grayson et al. |
| 2007/0067735 A1 * | 3/2007 | Hawley et al. ................. 715/792 |
| 2007/0124153 A1 | 5/2007 | Fendrick |
| 2008/0255863 A1 | 10/2008 | Mack et al. |
| 2009/0287557 A1 * | 11/2009 | Etheredge et al. ......... 705/14.17 |

OTHER PUBLICATIONS

"Citibank® Online Statements-Introductory Guide", [online]. Citigroup. [retrieved on Jun. 22, 2007]. Retrieved from the Internet: <URL: http://www.ogs.state.ny.us/purchase/snt/wordfiles/7900802837OnlineSmt_Guide_dos.doc>, 2 pgs.

"OfficeMax HSBC Business Solutions Online Account Management—Frequently Asked Questions", [online]. © 2007 HSBC North America Inc. [retrieved on Jun. 22, 2007]. Retrieved from the Internet: <https://www.hrscommercial.com/ccrsc/ecare?cmd_Redirect=FAQ_OnlineAccess&org=773>, 2 pgs.

"Synovous Banking Online Access—Frequently Asked Questions", [online]. [retrieved on Jun. 22, 2007]. Retrieved from the Internet: <URL: http://www.synovus.com/banking/bonlineaccess/faq.cfm>, 6 pgs.

"Vonage Online Account", [online]. © 2001-2007 Vonage Marketing, Inc. [retrieved on Jun. 22, 2007]. Retrieved from the Internet: <URL: http://www.vonage.com/help.php?article=1250&category=65&nav=6>, 2 pgs.

* cited by examiner

DOCUMENT PREFERENCES — 802

○ DELIVER ALL MY DOCUMENTS ONLINE — 812
◉ SPECIFY WHICH DOCUMENTS TO DELIVER ONLINE — 814

○ DELIVER ALL MY BILLS ONLINE
816 — ◉ SPECIFY BILLS
☑ AUTO AND PROPERTY INSURANCE BILLS
☑ CREDIT CARD BILLS
☐ LIFE, HEALTH, AND ANNUITY BILLS

◉ DELIVER ALL MY INSURANCE DOCUMENTS ONLINE   ○ SPECIFY INSURANCE DOCUMENTS

○ DELIVER ALL MY BANKING DOCUMENTS ONLINE   ◉ SPECIFY BANKING DOCUMENTS
818
☑ CHECKING STATEMENTS
☑ SAVINGS STATEMENTS
☐ LOAN STATEMENTS
☐ IRA STATEMENTS

◉ DELIVER ALL MY INVESTMENT DOCUMENTS ONLINE   ○ SPECIFY INVESTMENT DOCUMENTS
◉ DELIVER ALL MY TAX DOCUMENTS ONLINE   ○ SPECIFY TAX DOCUMENTS

EMAIL PREFERENCES — 804

PRIMARY EMAIL ADDRESS:   JANE_DOE@HOST.COM — 820

DELIVERY OPTIONS:   ◉ DETAILED EMAIL NOTIFICATIONS (SAMPLE) — 822
○ STANDARD EMAIL NOTIFICATIONS (SAMPLE)
○ NO EMAIL NOTIFICATIONS

* NOTIFICATION IS REQUIRED FOR ALL INVESTMENT AND TAX DOCUMENTS, REGARDLESS OF THIS SELECTION

ONLINE AGREEMENT — 806

DOCUMENTS WILL BE DELIVERED IN PDF FORMAT.
☐ PLEASE CONFIRM THAT YOU CAN VIEW THIS SAMPLE DOCUMENT. — 824

VIEW THE DOCUMENTS ONLINE AGREEMENT WHICH DESCRIBES YOUR RIGHT TO RECEIVE PAPER DOCUMENTS OR WITHDRAW CONSENT, AND YOUR OPTION TO CHANGE DOCUMENT PREFERENCES, AND YOUR SYSTEM REQUIREMENTS.
☐ I HAVE READ AND AGREE TO THE TERMS AND CONDITIONS OF THE ONLINE AGREEMENT — 826

(CANCEL) — 808   (SUBMIT) — 810

*FIG. 8*

SYSTEMS AND METHODS FOR ONLINE DOCUMENT SIGN-UP

CROSS REFERENCES

This application is related to U.S. patent application Ser. No. 11/782,562, filed Jul. 24, 2007, entitled "SYSTEMS AND METHODS FOR ONLNE DOCUMENT SIGN-UP", now abandoned and U.S. patent application Ser No. 11/782,574, filed July 24, 2007, entitled "SYSTEMS AND METHODS FOR ONLNE DOCUMENT SIGN-UP", now abandoned, all of which are incorporated herein by reference in their entirety.

TECHNICAL FIELD

Various embodiments described herein relate generally to computer systems, and more particularly, but not by way of limitation, to systems and methods for online document sign-up.

BACKGROUND

Wide-area networks, including world-wide networks, such as the Internet, have become essential tools for personal and business use. Increases in network bandwidth, security, and accompanying programming complexity have allowed users of these networks to share ever expanding amounts of information electronically. Working toward a paperless workflow, businesses strive to provide information traditionally delivered on paper in an electronic document. As more consumers gain access to these networks, they may prefer to receive correspondence from businesses in an electronic form.

SUMMARY

Systems and methods for online document sign-up are described. In an embodiment, a system comprises a first module configured to present a hypertext document and a submission control, using the hypertext document, to a user, wherein the hypertext document comprises a group of controls that reflect a hierarchy of documents available for online delivery; a second module configured to receive, when the submission control is activated, an indication of selected controls from the group of controls; and a third module configured to use the indication of selected controls to manage online document delivery.

In an embodiment, a system for presenting a single-page online document delivery sign-up, comprises a first module configured to identify a user of an online system; a second module configured to determine a financial account associated with the user; and a third module configured to present an expanding and collapsing hierarchical control in the single page to the user, wherein the hierarchical control is configured to display the financial account associated with the user.

In an embodiment, a system comprises a first module configured to receive, from a support representative, an indicia reflecting a user's preference associated with online document delivery; a second module configured to receive, from an online interface, an indication that the user accepts an agreement associated with online document delivery; and a third module configured to manage the online document delivery using the indicia reflecting the user's preference after the indication that the user agreed to the agreement has been received. Other embodiments are described.

BRIEF DESCRIPTION OF THE DRAWINGS

FIG. 8 is an example of a graphical user-interface according to various embodiments.

DETAILED DESCRIPTION

The following detailed description includes references to the accompanying drawings, which form a part of the detailed description. The drawings show, by way of illustration, example embodiments. These embodiments, which are also referred to herein as "examples," are described in enough detail to enable those skilled in the art to practice aspects of the inventive subject matter.

In this document, the terms "a" or "an" are used, as is common in patent documents, to include one or more than one. In this document, the term "or" is used to refer to a nonexclusive or, unless otherwise indicated.

System Overview

Figure 1:
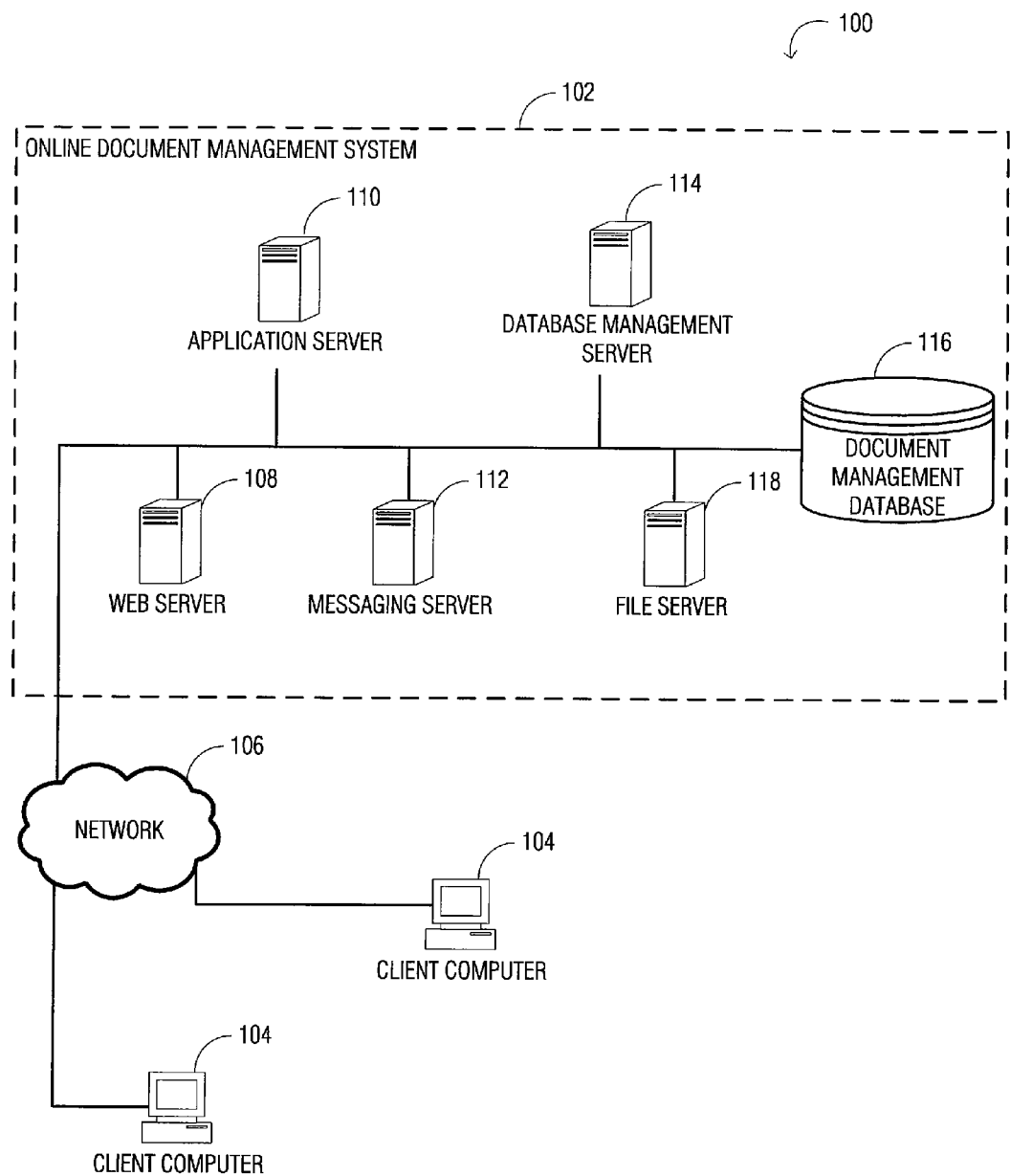
FIG. 1 is a schematic view of a computer network system according to various embodiments.

FIG. 1 is a schematic view of a computer network system 100 according to various embodiments. The computer network system 100 includes an online document management system 102 and a client computer 104, communicatively coupled via a network 106. In an embodiment, the online document management system 102 includes a web server 108, an application server 110, a messaging server 112, a database server 114, which is used to manage at least a document management database 116, and a file server 118. The online document management system 102 may be implemented as a distributed system, for example one or more elements of the online document management system 102 may be located across a wide-area network from other elements of the online document management system 102.

The network 106 may include local-area networks (LAN), wide-area networks (WAN), wireless networks (e.g., 802.11 or cellular network), the Public Switched Telephone Network (PSTN) network, ad hoc networks, personal area networks (e.g., Bluetooth) or other combinations or permutations of network protocols and network types. The network 106 may include a single local area network (LAN) or wide-area network (WAN), or combinations of LAN's or WAN's, such as the Internet. The various devices coupled to the network 106 may be coupled to the network 106 via one or more wired or wireless connections.

The web server 108 may communicate with the file server 118 to publish or serve files stored on the file server 118. The web server 108 may also communicate or interface with the application server 110 to enable web-based presentation of information. For example, the application server 110 may consist of scripts, applications, or library files that provide primary or auxiliary functionality to the web server 108 (e.g., multimedia, file transfer, or dynamic interface functions). In addition, the application server 110 may also provide some or the entire interface for the web server 108 to communicate with one or more of the other servers in the online document management system 102, e.g., the messaging server 112 or the database management server 114.

The document management database 116 may include data to administer, track, audit, and provide reports on one or more documents. For example, the document management database 116 may be structured to include some or all of the following information: a document identifier (e.g., a title, an invoice number, a month and year of a statement), a document location (e.g., a path and filename on the file server 118), a document type (e.g., statement, bill, informational, policy), a related business unit (e.g., auto insurance, health insurance, credit card services, personal loan), tracking data (e.g., creation date, last modified date, identities of persons who viewed or modified the document), and other characteristics (e.g., file size, file type, encryption or security, archival status). The document management database 116 may be implemented as a relational database, a centralized database, a distributed database, an object oriented database, or a flat database in various embodiments.

In an embodiment, a user (not shown) at a client computer 104 may interface with the online document management system 102, such as by using the web server 108, to sign-up for online document delivery or access. The user may be presented with options, such as which documents to provide using online delivery, in a simple interface provided by the web server 108. In an embodiment, the web server 108 provides a single hypertext document that includes controls that the user can manipulate to indicate which documents to deliver, the method of delivery, and other aspects of online document delivery. As documents are generated, such as during a billing cycle or at quarterly or annual reporting periods, they may be provided electronically to the user.

In various embodiments, the online document management system 102 may provide a single-page interface to a user for online document sign-up. FIGS. 2-5 generally describe systems and processes that may perform such tasks. In some embodiments, processes are implemented as instructions on computer-readable medium.

Figure 2:
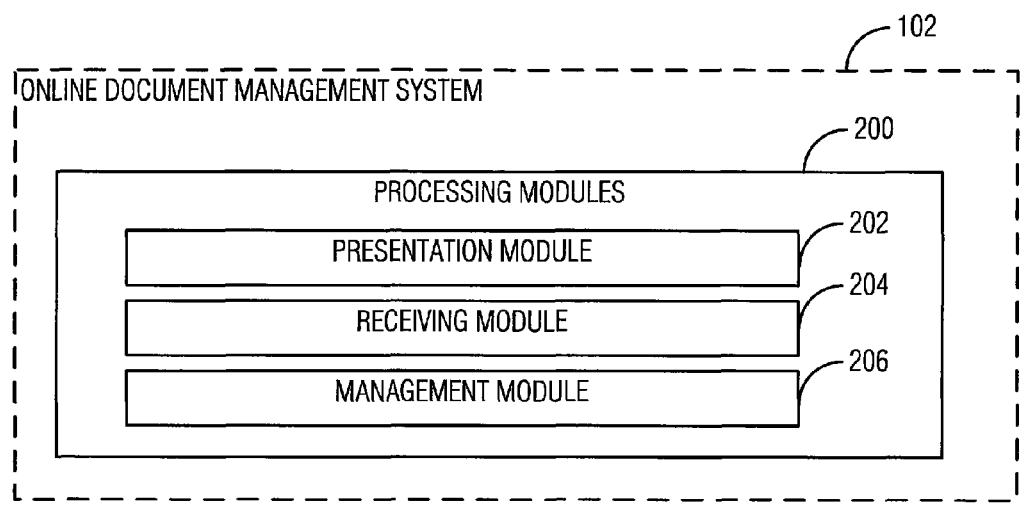
FIG. 2 is a block diagram of processing modules of the online document system shown in FIG. 1 according to various embodiments.

FIG. 2 is a block diagram of processing modules 200 of the online document management system 102 shown in FIG. 1, according to various embodiments. The processing modules 200 include a first module 202 to present documents available for online delivery, a second module 204 to receive selected documents, and a third module 206 to manage online document delivery using the selected documents.

The first module 202 presents documents available for online delivery and a submission control. In an embodiment, the documents are displayed using a group of controls within a hypertext document. The group of controls may be arranged to reflect a document hierarchy. For example, documents may be arranged from a broad categorization to a narrow categorization, such as from business groups to products. In an embodiment, the hierarchy of documents is arranged using at least one document type category. In an embodiment, the at least one document type category comprises a bills category, an insurance documents category, a banking documents category, an investments documents category, and a tax documents category. In a further embodiment, each document type category comprises at least one sub-category associated with a product. In yet a further embodiment, the product is selected from the group of products consisting of: auto and property insurance, life insurance, health insurance, credit card service, checking account, savings account, loan account, and investment account.

As an example, a top level of a hierarchy includes business groups, such as "Insurance," "Banking," and "Investments." A second level of the hierarchy may include types of each product offered in a business group, for example, "Insurance" may include "Auto," "Life," and "Health"; "Banking" may include "Checking," "Savings," and "Loan"; and "Investments" may include "401(k)" and "529 Plan." Additional categories may be included in the top level, such as "Bills" and "Taxes." The "Bills" group may include second-level groups, such as "Auto and Property Insurance Bills," "Credit Card Bills," and the like. The "Taxes" group may include second-level groups, such as "Annuity taxes," "1099-INT" statements, and the like. In some embodiments, additional levels in the hierarchy are presented to provide more granular control to the user. As an example, health insurance documents for a husband and wife may be presented separately so the user can choose to only have one or the other delivered online.

In an embodiment, the first module is configured to present an electronic notification control in the hypertext document. The electronic notification control may be used to capture a user's preference for the mode, content, and other aspects of notification. For example, a user may specify an email address to be used for delivery and a format of the email (e.g., detailed, standard). A detailed notification may include a listing a specific documents available for the user to view, while a standard notification may only include an indication that new documents are available for the user to view.

In an embodiment, the first module is configured to present an agreement in the hypertext document. The agreement may be presented in-line with the surrounding text in the hypertext document. The agreement may also be presented via a hyperlink, which may open a new window (e.g., in a pop-up window), for the user to review.

The second module 204 receives receive selected documents. The user may manipulate the group of controls within the hypertext document to select documents associated with document types, products, business groups, accounts, or other categorizations.

The third module 206 manages online document delivery using the selected documents. As an example, the third module 206 may save the selected documents in the document management database 116. The online document management system 102 may then refer to the document management database 116 at a later time to determine which delivery method (e.g., online or paper) is chosen by the user.

Some or all of the information presented by the first module 202 may be presented during or at the completion of a sign-up process. For example, as the user is signing up for a particular account, such as a banking account, investment account, insurance account, or the like, the user may be presented with one or more documents associated with the particular account and the option to have them delivered electronically.

Figure 3:
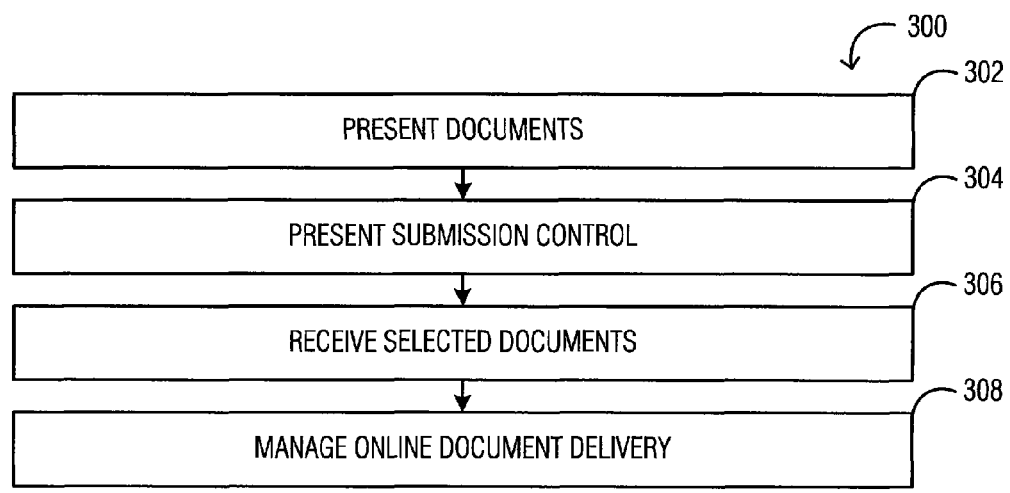
FIG. 3 is a flowchart illustrating a method according to various embodiments.

FIG. 3 is a flowchart illustrating a method 300 according to various embodiments. At 302, a hierarchy of documents available for online delivery is presented to a user. In an embodiment, the hierarchy of documents is presented using a group of controls in a hypertext document. In an embodiment, the hierarchy of documents is arranged using at least one document type category. In an embodiment, the at least one document type category comprises a bills category, an insurance documents category, a banking documents category, an investments documents category, and a tax documents category. In a further embodiment, each document type category comprises at least one sub-category associated with a product. In yet a further embodiment, the product is selected from the group of products consisting of: auto and property insurance, life insurance, health insurance, credit card service, checking account, savings account, loan account, and investment account.

At 304, a submission control is presented to the user in the hypertext document. The submission control may comprise a hypertext markup language (HTML) form submit control or other control that may be programmed to submit the contents of the hypertext document for processing. At 306, an indication of selected controls from the group of controls is received when the submission control is activated. At 308, the indication of selected controls is used to manage online document delivery.

Figure 4:
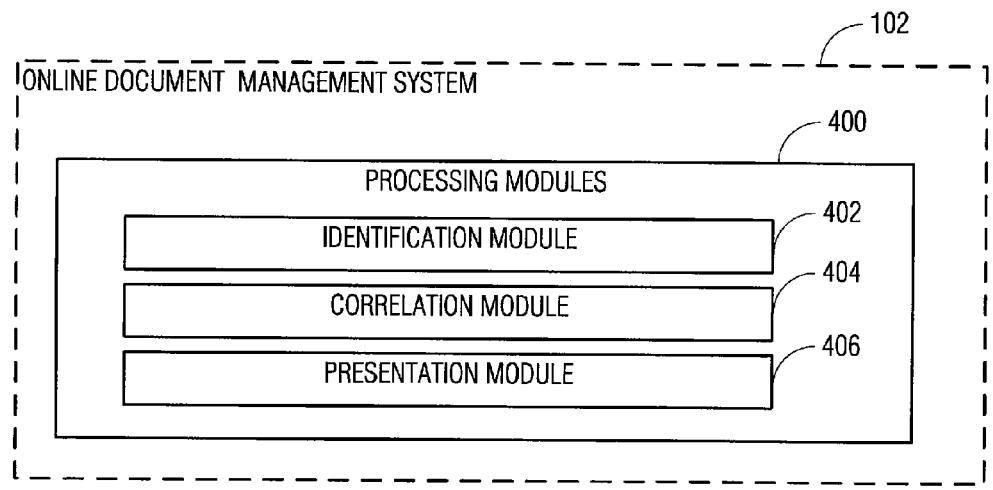
FIG. 4 is a block diagram of processing modules of the online document system shown in FIG. 1 according to various embodiments.

FIG. 4 is a block diagram of processing modules 400 of the online document management system 102 shown in FIG. 1, according to various embodiments. The processing modules 400 are generally configured to present a single-page online document delivery sign-up interface and include a first module 402 to identify a user, a second module 404 to determine a financial account associated with the user, and a third module 406 to present a hierarchical control that includes the financial account to the user.

The first module 402 identifies a user. For example, a user may establish and maintain an online account secured by a username and a password. When the user logs into the account, the first module 402 may capture the user's identity. Other methods of identifying a user of an online system may be used either in place of or in conjunction with an account-based system, such as by using persistent state information (e.g., cookies), reverse Internet Protocol (IP) lookups, hardware address lookups (e.g., media access control (MAC) address), or the like.

The second module 404 determines a financial account associated with the user. In various embodiments, the financial account is a bank card account, an insurance account, a banking account, an investment account, or a retirement account. In embodiments, the financial account may be a current or past account. For example, a loan account that has been closed after a complete repayment may be identified by the second module 404.

The third module 406 presents a hierarchical control to the user, where the hierarchical control includes the financial account. In an embodiment, the hierarchical control is an expanding and collapsing control presented in a single page to the user. The page may include a hypertext document, such as an HTML page. A single page is one that is substantially presented in a single pane or window in a graphical user-interface. The single page may include dynamic elements, such as pop-up windows, tooltip-like dynamic layers, or elements that may be hidden or shown dynamically within the page. The single page may further include dynamically loadable portions, such as with the use of Asynchronous JavaScript and XML (AJAX) programming. In an embodiment, determining the financial account and presenting the hierarchical control occur during or at the completion of a sign-up process for the financial account.

In a further embodiment, a fourth module is configured to present a submission control in the single page. The submission control may be an HTML control, such as a form submit button, or other programmable user-interface control, such as a hyperlink with an associated programming script.

In a further embodiment, a fifth module is configured to receive an indication from the user when the submission control is activated, where the indication comprises a selection operation using the hierarchical control and specifying a document to deliver online.

In a further embodiment, a sixth module is configured to use the indication to manage online document delivery. For example, the selected documents may be stored and presented at a later time via the online interface to the user.

Figure 5:
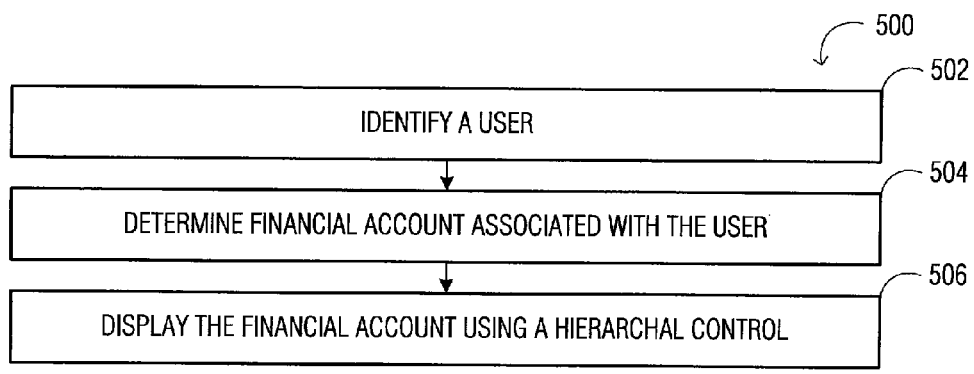
FIG. 5 is a flowchart illustrating a method according to various embodiments.

FIG. 5 is a flowchart illustrating a method 500 according to various embodiments. The method 500 is adapted to present a single-page online document delivery sign-up interface. At 502, a user is identified. As described above with respect to module 402 in FIG. 4, identification may be achieved using a unique username and password that may be associated with the user.

At 504, a financial account associated with the user is determined. In various embodiments, the financial account may be a bank card account, an insurance account, a banking account, an investment account, or a retirement account. In embodiments, the financial account may be a current or past account. In some instances, electronic documents may not be available for past-held accounts, and as such, these accounts may not be returned by block 504.

At 506, the financial account is displayed using a hierarchical control. In an embodiment, the hierarchical control is displayed within a single hypertext document. In an embodiment, the hierarchical control is an expanding and collapsing control. For example, using a scripting language, such as JavaScript, portions of a hierarchy may be hidden or shown dynamically in response to user's actions (e.g., clicking an expand or collapse icon). In a further embodiment, the hierarchical control is presented during or at the completion of a sign-up process for the financial account. For example, as a user is navigating a user-interface to qualify for or obtain a financial account (e.g., an insurance policy, a credit card account, a checking account, an investment account, a retirement account, or other banking or financial account), the user may be presented with financial accounts that the user currently, or previously, is associated with.

In a further embodiment, a submission control is presented in the single page. In a further embodiment, when the submission control is activated by the user, an indication comprising a selection operation using the hierarchical control and specifying a document to deliver online is received. The indication may be used to manage online document delivery, in a further embodiment.

Figure 6:
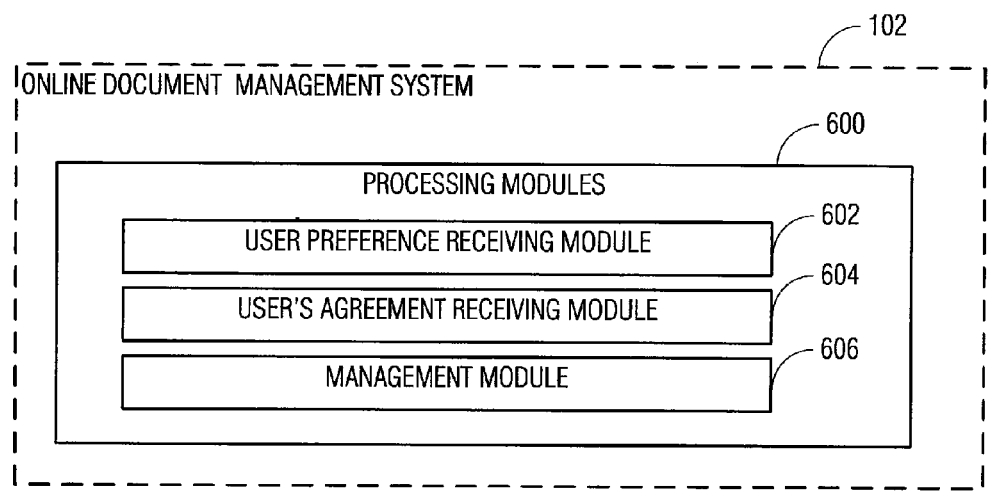
FIG. 6 is a block diagram of processing modules of the online document system shown in FIG. 1 according to various embodiments.
Figure 7:
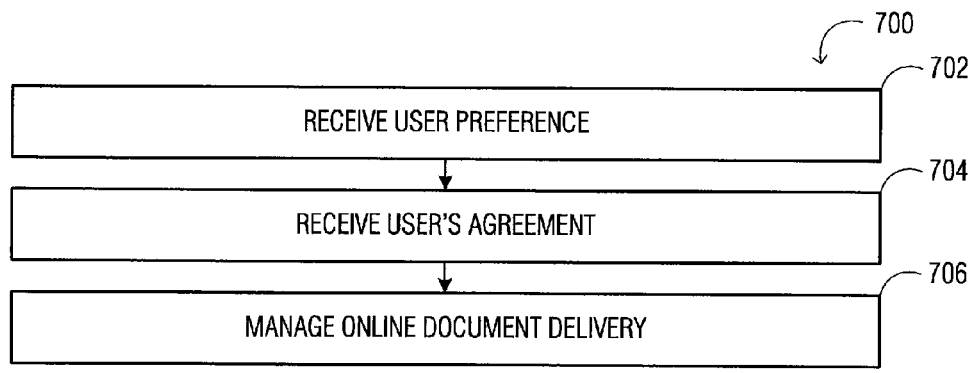
FIG. 7 is a flowchart illustrating a method according to various embodiments.

While FIGS. 2-5 illustrate embodiments in which a user may interact with an online document management system 102 to sign-up for online document delivery, FIGS. 6 and 7 illustrate embodiments where a user is assisted by another person, such as a support representative, in signing up for online document access and delivery.

FIG. 6 is a block diagram of processing modules 600 of the online document management system 102 shown in FIG. 1, according to various embodiments. The processing modules 600 include a first module 602 to receive a user preference, a second module 604 to receive a user's agreement, and a third module 606 to manage online document delivery.

The first module 602 receives a user preference. The user preference may represent various aspects of a user's preference with respect to online document access or delivery, such as, for example, which documents should be made available, what document format should be used, how the user will be notified of new documents when they become available, or when to begin or end online document delivery. In an embodiment, the user's preference comprises a selection operation specifying a document to deliver using an online medium. In an embodiment, the user's preference represents a selection operation specifying a product, in which documents associated with the product will be delivered online. For example, the product may include such things as financial accounts (e.g., insurance policy, banking account, investment account) or financial services (e.g., electronic bill payment). In an embodiment, the user's preferences represents a selection operation specifying a document type, in which documents associated with the document type will be delivered online. For example, document types may include tax documents, bills, statements, policies, and the like.

In an embodiment, the user may convey their preference to a support representative. This communication may be done using various modes, such as telephonically, by facsimile, in writing, or using an online method (e.g., a live chat session, email, text messaging). In general, the user may desire assistance with the online document delivery sign-up procedure and may wish to ask questions or be guided along by another person. As such, more interactive modes, such as a live chat session online or a telephonic interview, may be preferable.

The second module 604 receives an indication that the user accepts an agreement associated with online document delivery. In an embodiment, the indication is received via an online interface. For example, after providing their preference to a support representative (which is captured by the first module 602), a user may access an online account and provide an indication that they accept the terms and conditions of an online agreement associated with electronic document delivery. The act of accepting the agreement may be needed to complete the sign-up process and activate electronic document delivery.

In an embodiment, the indication that a user accepts the online agreement verifies the ability to view an online document format. For example, to ensure that users are able to read a particular document format (e.g., portable document format (PDF)), the provider of the online document management system 102 may insist on having the user verify that they can access such document formats.

As a continuing example, during the agreement procedure, which may be performed online, the documents or document types selected during a previous telephonic interview with a support representative may be reflected in a hierarchical control shown to the user at the time of the agreement. The user may then verify the documents or document types selected and then agree to the terms and conditions, knowing that their preference is recorded correctly. In addition, in some embodiments, the user may modify their selections before accepting the agreement. In an embodiment, a fourth module presents, using the online interface, a group of controls that reflect a hierarchy of documents available for online delivery to the user, where the group of controls is configured using the indicia reflecting the user's preference and a fifth module receives, from the online interface, a group of selected controls from the group of controls.

In other embodiments, the user may be presented a read-only summary of documents previously selected. In an embodiment, a sixth module presents, using the online interface, a summary of documents that will be delivered online based on the user's preference; and a seventh module receives a verification indicating that the summary is accurate.

The third module 606 manages the online document delivery using the user's preference after the agreement has been accepted. Management may include providing access, generating files, delivering notification, and the like.

FIG. 7 is a flowchart illustrating a method 700 according to various embodiments. At 702, a user preference is received. In an embodiment, the user preference is supplied by a person other than the user, such as a support representative. The user preference is indicative of a user's preference regarding at least one aspect of online document delivery. In an embodiment, the user's preference comprises a selection operation specifying a document to deliver using an online medium. In an embodiment, the user's preference comprises a selection operation specifying a product, in which documents associated with the product will be delivered online. In an embodiment, the user's preferences comprises a selection operation specifying a document type, in which documents associated with the document type will be delivered online.

At 704, an indication that the user accepts an agreement related to online document delivery is received. In an embodiment, the agreement verifies the ability to view an online document format.

At 706, online document delivery is managed using the user's preference after the agreement has been accepted.

In a further embodiment, a group of controls that reflect a hierarchy of documents available for online delivery to the user is presented, where the group of controls is configured using the user's preference and a group of selected controls from the group of controls is received. This configuration may be used to allow the user to modify their preferences regarding which documents to make available or deliver online before accepting the agreement.

In a further embodiment, a summary of documents that will be delivered online based on the user's preference is presented and a verification indicating that the summary is accurate is received. In such a configuration, the selected documents and possibly other aspects of the user's preferences are summarized and presented to the user so verification can be made before accepting the agreement.

User-Interfaces

Figure 9:
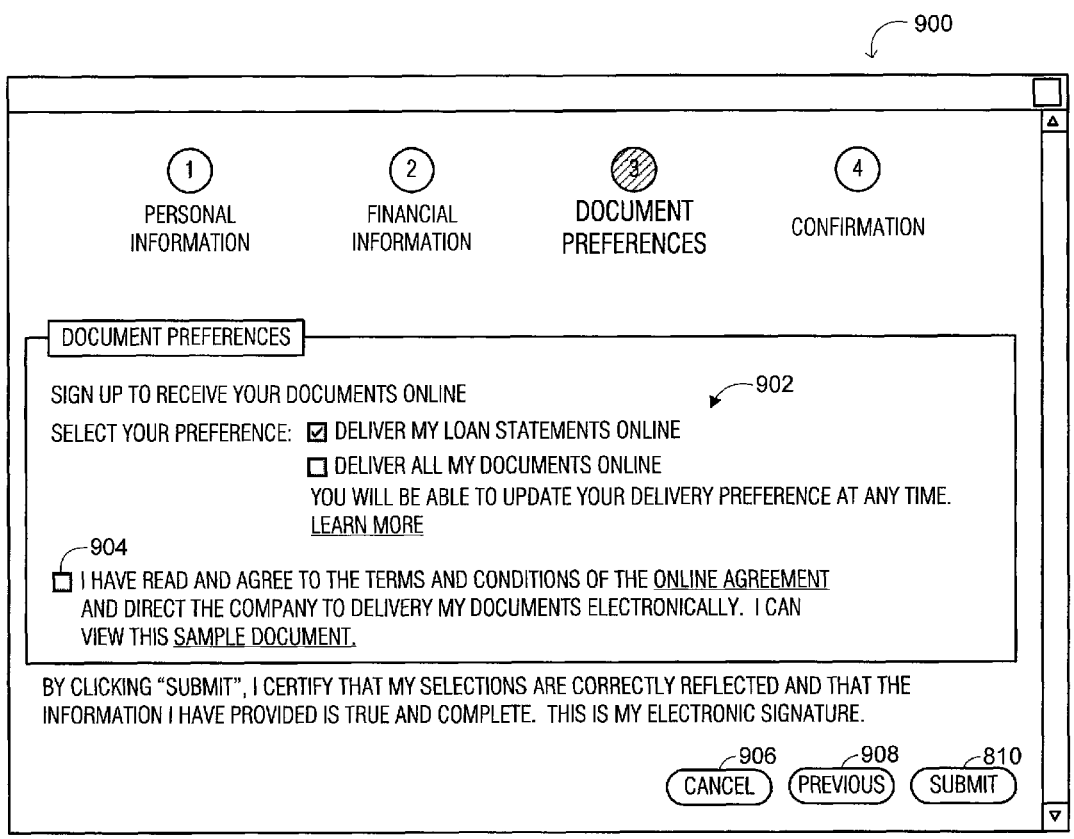
FIG. 9 is an example of a graphical user-interface according to various embodiments.

In various embodiments, the online document management system 102 may be configured to provide graphical interfaces that a user can access to sign-up, authorize, and manage online document delivery. FIGS. 8 and 9 describe two examples of user-interfaces that may be implemented in a graphical user-interface, such as a web browser or other suitable graphical interface.

FIG. 8 is an example of a graphical user-interface 800 according to various embodiments. The user-interface 800 includes document preference controls 802, email preference controls 804, online agreement controls 806, a cancel control 808, and a submission control 810.

In an embodiment, the document preference controls 802 include a hierarchical control. In the example depicted in FIG. 8, the initial state of the hierarchical control may have the "Deliver All My Documents Online" radio control 812 selected, in which case the rest of the hierarchical control would be collapsed. In the state shown in FIG. 8, the user has selected the "Specify Which Documents to Deliver" radio control 814, which expanded the hierarchical control to show the categories of documents available to be delivered online. Further, the user has selected both the "Specify Bills" radio control 816 and the "Specify Banking Documents" radio control 818, which has expanded each selected document category to show specific document types. The example shown in FIG. 8 includes a selection of a subset of these document types for illustrative purposes.

In an embodiment, the email preferences controls 804 include an email address control 820 and delivery option controls 822. The email address control 820 may be used to verify the primary email address and, in some embodiments, may be used to modify the email address to a preferred address. For example, in an embodiment, clicking on the email address may cause a pop-up window to appear, where the user can modify the email address. The delivery option controls 822 allow the user to select the format of a notification email. The standard notification may be formatted to include a general statement that a new document is available to the user online. In contrast, the detailed notification may be formatted to include a description of which documents are newly available to the user.

In an embodiment, the online agreement controls include a confirmation control 824 and an agreement control 826. The user may be required to check the confirmation control 824 to verify that he can view the electronic document format. In addition, the user may be required to accept the online agreement and indicate such acceptance by checking the agreement control 826.

The cancel control 808 may be used by the user to cancel the online document sign-up procedure. The submission control 810 may be used by the user to submit the selected documents, options, and acceptance to the online document management system 102.

FIG. 9 is an example of a graphical user-interface 900 according to various embodiments. The user-interface 900 includes document preference controls 902, an online agreement control 904, a cancel control 906, a previous control 908, and a submission control 910.

The user-interface 900 depicted in FIG. 9 may be displayed during or at the completion of enrollment or signing-up for a financial service. For example, a user may be presented with the option to sign up to receive documents online as an integrated part of a loan application process. In the example shown, the online document sign-up option is displayed at "Step 3" of a loan application process.

The user may check one or more boxes in the document preference controls 902 to indicate whether the loan documents and/or all of the user's documents will be delivered online. In addition, the user may be required to check the online agreement control 904 checkbox to indicate that he accepts the terms and conditions of the online agreement and is able to view the documents in an electronic format (e.g., PDF). Once complete, the user can navigate to the previous step using the previous control 908, navigate to the next step using the submission control 910, or cancel the application process using the cancel control 906.

Hardware and Software Platform

Figure 10:
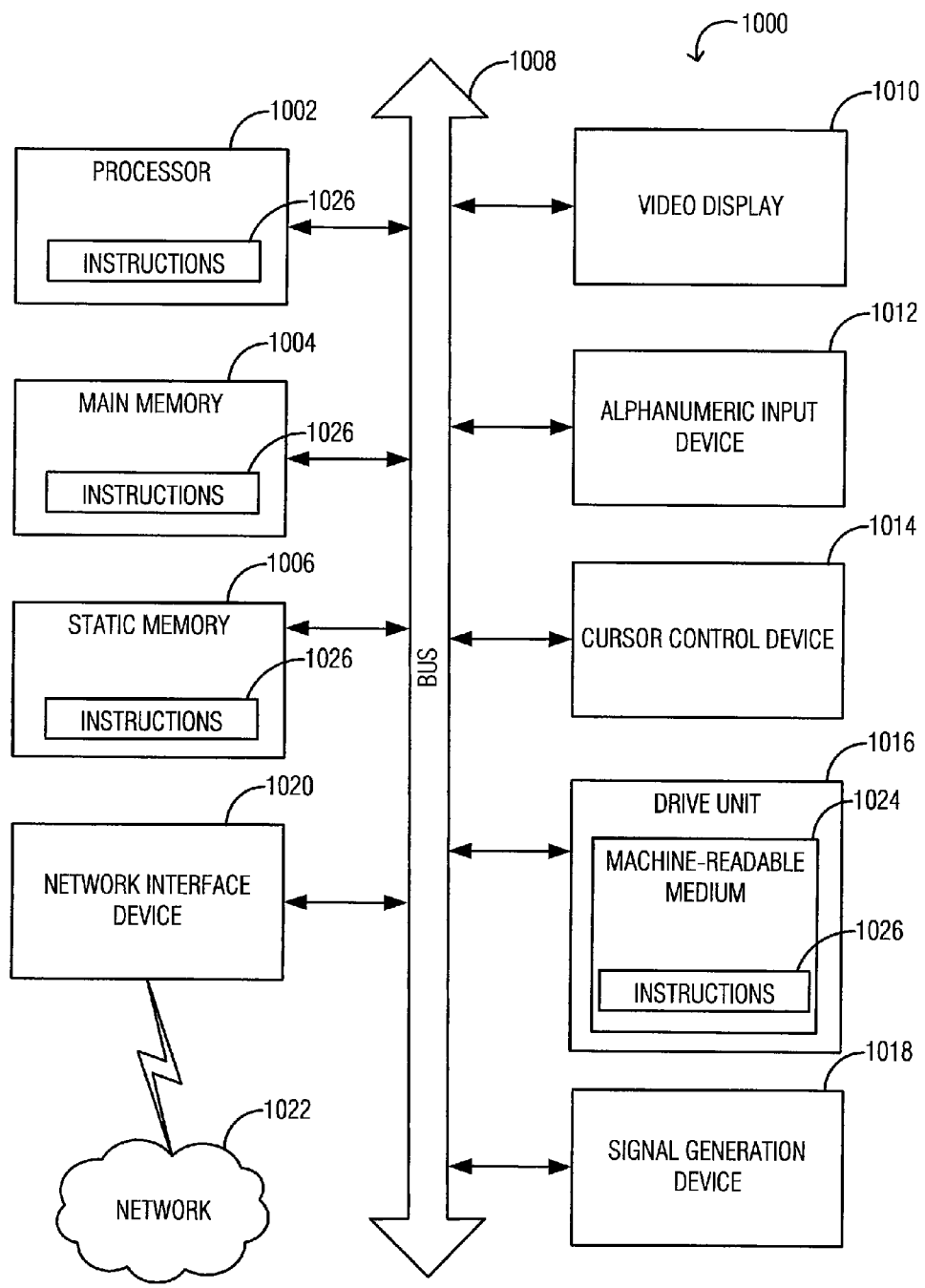
FIG. 10 is a block diagram illustrating a machine in the example form of a computer system, within which a set or sequence of instructions for causing the machine to perform any one of the methodologies discussed herein may be executed, according to various embodiments.

FIG. 10 is a block diagram illustrating a machine in the example form of a computer system 1000, within which a set or sequence of instructions for causing the machine to perform any one of the methodologies discussed herein may be executed, according to various embodiments. In alternative embodiments, the machine may comprise a computer, a network router, a network switch, a network bridge, Personal Digital Assistant (PDA), a cellular telephone, a web appliance, set-top box (STB) or any machine capable of executing a sequence of instructions that specify actions to be taken by that machine.

The computer system 1000 includes a processor 1002, a main memory 1004 and a static memory 1006, which communicate with each other via a bus 1008. The computer system 1000 may further include a video display unit 1010 (e.g., a liquid crystal display (LCD) or a cathode ray tube (CRT)). The computer system 1000 also includes an alphanumeric input device 1012 (e.g., a keyboard), a cursor control device 1014 (e.g., a mouse), a disk drive unit 1016, a signal generation device 1018 (e.g., a speaker) and a network interface device 1020 to interface the computer system to a network 1022.

The disk drive unit 1016 includes a machine-readable medium 1024 on which is stored a set of instructions or software 1026 embodying any one, or all, of the methodologies described herein. The software 1026 is also shown to reside, completely or at least partially, within the main memory 1004 and/or within the processor 1002. The software 1026 may further be transmitted or received via the network interface device 1020.

For the purposes of this specification, the term "machine-readable medium" or "computer-readable medium" shall be taken to include any medium which is capable of storing or encoding a sequence of instructions for execution by the machine and that cause the machine to perform any one of the methodologies. The terms "machine-readable medium" or "computer-readable medium" shall accordingly be taken to include, but not be limited to, solid-state memories, optical and magnetic disks, and other temporary, transient, or permanent storage means, such an executable streaming downloadable program. Further, it will be appreciated that the software could be distributed across multiple machines or storage media, which may include the machine-readable medium.

Method embodiments described herein may be computer-implemented. Some embodiments may include computer-readable media encoded with a computer program (e.g., software), which includes instructions operable to cause an electronic device to perform methods of various embodiments. A software implementation (or computer-implemented method) may include microcode, assembly language code, or a higher-level language code, which further may include computer-readable instructions for performing various methods. The code may form portions of computer program products. Further, the code may be tangibly stored on one or more volatile or non-volatile computer-readable media during execution or at other times. These computer-readable media may include, but are not limited to, hard disks, removable magnetic disks, removable optical disks (e.g., compact disks and digital video disks), magnetic cassettes, memory cards or sticks, random access memories (RAM's), read only memories (ROM's), and the like.

Such embodiments of the inventive subject matter may be referred to herein individually or collectively by the term "invention" merely for convenience and without intending to voluntarily limit the scope of this application to any single invention or inventive concept, if more than one is in fact disclosed. Thus, although specific embodiments have been illustrated and described herein, any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description. For example, one module may be implemented as multiple logical modules, or several modules may be implemented as a single logical module. As another example, modules labeled as "first," "second," and "third," etc., may be implemented in a single module, or in some combination of modules, as would be understood by one of ordinary skill in the art.

In the foregoing Detailed Description, various features are grouped together in a single embodiment for the purpose of streamlining the disclosure. This method of disclosure is not to be interpreted as reflecting an intention that the claimed embodiments of the invention require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate preferred embodiment.

In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The Abstract is provided to comply with 37 C.F.R. §1.72 (b), which requires that it allow the reader to quickly ascertain the nature of the technical disclosure. It is submitted with the understanding that it will not be used to interpret or limit the scope or meaning of the claims.

What is claimed is:

1. A system for presenting a single-page online document delivery sign-up, comprising:
   a processor; and
   a storage device having machine-readable instructions contained therein which when executed cause the processor to:
   identify a user of an online system;
   determine a first financial account and a second financial account associated with the user, wherein the first financial account and the second financial account are each selected from the group of accounts consisting of: an insurance account, a banking account, an investment account, and a retirement account,
      wherein the first financial account and the second financial account associated with the user are in a different group of accounts;
   present an expanding and collapsing hierarchical control including a number of document types associated with the first financial account in one or more levels of the first financial account and a number of document types associated with the second financial account in one or more levels of the second financial account in the single page to the user,
      the hierarchical control with one or more levels comprises at least a first level and a second level, wherein the second level is a subset of the first level;
   receive a selection of one or more particular document types associated with the at least first level of the first financial account and the at least first level of the second financial account via the hierarchical control;
   deliver the selected particular document types, generated subsequent to receiving the selection and associated with the selected document type, online to the user via the online system responsive to the document being generated; and
   determine one or more unselected document types, generated subsequent to receiving the selection is to be delivered in paper to the user.

2. The system of claim 1, further comprising instructions which when executed cause the processor to present a submission control in the single page.

3. The system of claim 2, further comprising instructions which when executed cause the processor to:
   receive an indication from the user when the submission control is activated, wherein the indication comprises a selection operation using the hierarchical control and specifying a document to deliver online; and
   use the indication to mange online document delivery.

4. The system of claim 1, wherein determining the financial account and presenting the hierarchical control occur during or at the completion of a sign-up process for the financial account.

5. The system of claim 1, wherein the financial account associated with the user includes current and past accounts.

6. A method of presenting a single-page online document delivery sign-up comprising:
   identifying, by a computer, a user of an online system;
   determining, by the computer, a first financial account and a second financial account associated with the user, wherein the first financial account and the second financial account are each selected from the group of accounts consisting of: an insurance account, a banking account, an investment account, and a retirement account,
      wherein the first financial account and the second financial account associated with the user are in a different group of accounts;
   presenting, by the computer, an expanding and collapsing hierarchical control including a number of document types associated with the first financial account in one or more levels of the first financial account and a number of document types associated with the second financial account in one or more levels of the second financial account in the single page to the user,
      the hierarchical control with one or more levels comprises at least a first level and a second level, wherein the second level is a subset of the first level;
   receiving a selection of one or more particular document types associated with the at least first level of the first financial account and the at least first level of the second financial account via the hierarchical control;
   delivering, by the computer, the selected particular document types, generated subsequent to receiving the selection and associated with the selected document type, online to the user via the online system responsive to the document being generated; and
   determining, by the computer, one or more unselected document types, generated subsequent to receiving the selection, is to be delivered in paper to the user.

7. The method of claim 6, further comprising presenting a submission control in the single page.

8. The method of claim 6, further comprising:
   receiving an indication from the user when the submission control is activated, wherein the indication comprises a selection operating using the hierarchical control and specifying a document to deliver online; and
   using the indication to manage online document delivery.

9. The method of claim 6, wherein determining the financial account and presenting the hierarchical control occur during or at the completion of a sign-up process for the financial account.

10. The method of claim 6, wherein the financial account associated with the user includes current and past accounts.

11. A non-transitory computer-readable medium including instructions for presenting a single-page online document delivery sign-up that, when performed by a computer, cause the computer to:
    identify, by the computer, a user of an online system;

determine, by the computer, a first financial account and a second financial account associated with the user, wherein the first financial account and the second financial account are each selected from the group of accounts consisting of: an insurance account, a banking account, an investment account, and a retirement account, wherein the first financial account and the second financial account associated with the user are in a different group of accounts;

present, by the computer, an expanding and collapsing hierarchical control including a number of document types associated with the first financial account in one or more levels of the first financial account and a number of document types associated with the second financial account in one or more levels of the second financial account in the single page to the user, the hierarchical control with one or more levels comprises at least a first level and a second level, wherein the second level is a subset of the first level;

receive, by the computer, a selection of one or more particular document types associated with the at least first level of the first financial account and the at least first level of the second financial account via the hierarchical control;

deliver, by the computer, the selected particular document types, generated subsequent to receiving the selection and associated with the selected document type, online to the user via the online system responsive to the document being generated; and determine, by the computer, one or more unselected document types, generated subsequent to receiving the selection, is to be delivered in paper to the user.

12. The non-transitory computer-readable medium of claim 11, further comprising instructions that cause the computer to present a submission control in the single page.

13. The non-transitory computer-readable medium of claim 11, further comprising instructions that cause the computer to:

receive an indication from the user when the submission control is activated, wherein the indication comprises a selection operation using the hierarchical control and specifying a document to deliver online; and use the indication to manage online document delivery.

14. The non-transitory computer-readable medium of claim 11, wherein determining the financial account and presenting the hierarchical control occur during or at the completion of a sign-up process for the financial account.

15. The non-transitory computer-readable medium of claim 11, wherein the financial account associated with the user includes current and past accounts.

* * * * *